United States Patent [19]

Baker et al.

[11] Patent Number: 4,489,420
[45] Date of Patent: Dec. 18, 1984

[54] CLEAR CHANNEL DETECTOR FOR BINARY DIGITAL DATA TRANSMISSION SYSTEM

[75] Inventors: Lewin T. Baker, Schenectady, N.Y.; Paul G. Huber, West Warwick, R.I.

[73] Assignee: General Electric Company, Schenectady, N.Y.

[21] Appl. No.: 473,826

[22] Filed: Mar. 9, 1983

[51] Int. Cl.³ .............................................. H04Q 9/00
[52] U.S. Cl. ........................................ 375/94; 370/89; 340/825.5
[58] Field of Search ................... 375/94, 51, 91, 76; 340/825.5, 825.1; 371/24; 370/89, 94; 455/58; 178/3

[56] References Cited

U.S. PATENT DOCUMENTS

| | | | |
|---|---|---|---|
| 3,619,785 | 11/1971 | Farrow | 375/94 |
| 3,925,732 | 12/1975 | Tanaka et al. | 375/94 |
| 4,199,663 | 4/1980 | Herzog | 370/85 |
| 4,234,952 | 11/1980 | Gable et al. | 370/94 |
| 4,375,102 | 2/1983 | Van Deal | 375/94 |
| 4,403,333 | 9/1983 | Gupta | 375/94 |
| 4,409,593 | 10/1983 | Bose | 370/89 |
| 4,439,856 | 3/1984 | Vlug | 370/94 |
| 4,442,531 | 4/1984 | Gupta | 375/94 |

Primary Examiner—Robert L. Griffin
Assistant Examiner—Stephen Chin
Attorney, Agent, or Firm—Geoffrey H. Krauss; James C. Davis, Jr.; Marvin Snyder

[57] ABSTRACT

A clear channel detector for use in a binary digital data transmission system in which collisions are possible between simultaneously transmitting stations all connected to a common transmission medium. The detector receives the output from each of a pair of different binary symbol detectors in the station receiver. The voltage difference between the binary symbol detector outputs is amplified, and the resulting bipolar voltage is converted to an absolute amplitude. After further amplification, a threshold adjustment is provided at a trigger subcircuit having at least one output signal indicating the presence of a clear transmission channel which is not presently in use.

11 Claims, 7 Drawing Figures

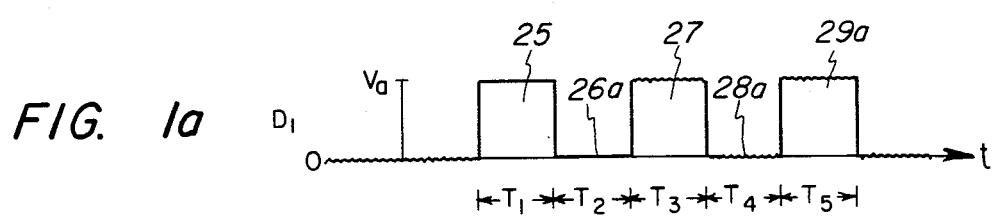
FIG. 1a
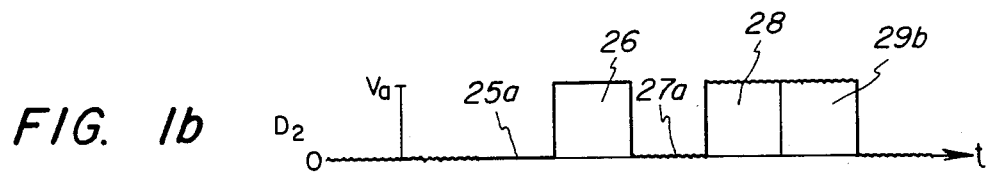
FIG. 1b
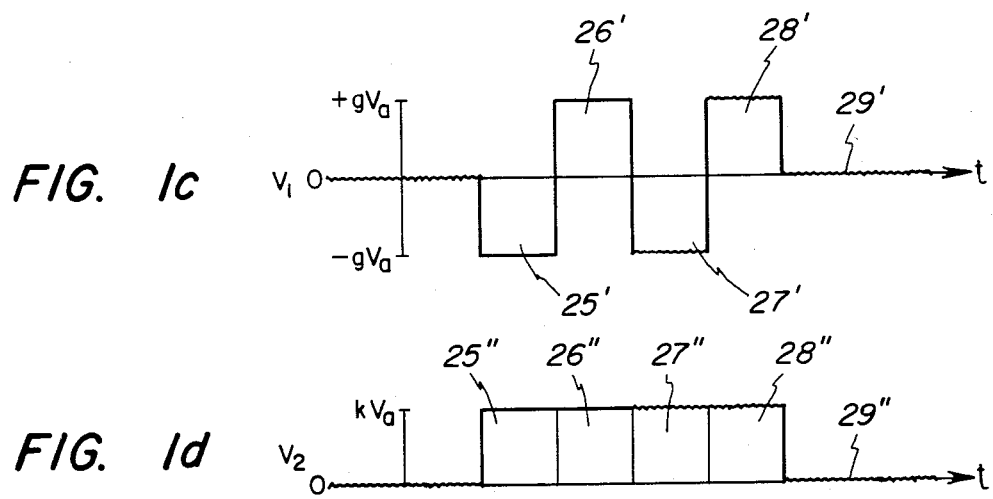
FIG. 1c
FIG. 1d
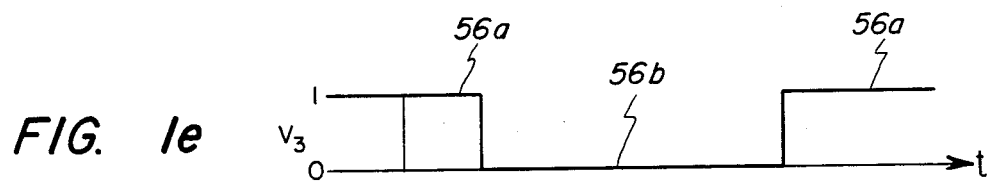
FIG. 1e
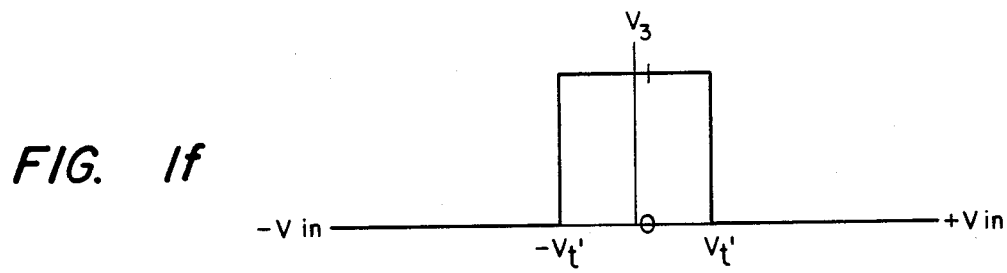
FIG. 1f

CLEAR CHANNEL DETECTOR FOR BINARY DIGITAL DATA TRANSMISSION SYSTEM

BACKGROUND OF THE INVENTION

The present application relates to digital data transmission systems and, more particularly, to a novel clear channel detector for use in determining that a common transmission channel is presently clear, whereby collisions between a plurality of simultaneously-transmitting data stations may be avoided.

In digital data communications systems having a plurality of transceivers connected to a common transmission medium, it is known to resolve collisions, occurring when a plurality of stations simultaneously attempt data transmission, by a carrier-sensing process. One carrier-sensing method has been to monitor an automatic gain control signal in the data receiver, to determine the strength of the received signal. A threshold is set such that the automatic gain control voltage will be above the threshold when a station in the system is actually transmitting and will be below the threshold when all stations are quiet and only noise is being received. Therefore, the decision as to whether or not another station in the system is actually transmitting is based upon the absolute amount of signal received at a particular station. If the transmission medium attenuation varies widely between stations, a transceiver using automatic gain control monitoring and a fixed threshold will not perform in the desired manner, because a weak signal will always be classified as noise, while a strong signal will be classified as a message even if that strong signal is composed entirely of noise. This is especially true in a power line carrier communications system which uses the power wiring, in a building and the like, as the communications medium; impedance modulation caused by other devices on the power circuits can cause rapid fading, of greater than 20 dB., during a single data bit-time interval.

For example, in the bit-echoed arbitration digital data transmission system described and claimed in co-pending application Ser. No. 322,495, filed Nov. 18, 1981, assigned to the assignee of the present invention and incorporated herein by reference, one of the transceivers in a multipletransceiver digital data transmission system acts as an echoer to resolve collisions when a plurality of transceivers simultaneously initiate data transmission on the common system media. During each bit-time interval, the echoer transceiver makes a decision as to which binary symbol, a "1" symbol or a "0" symbol, was received and retransmits, or echoes, the received bit symbol according to that decision. Since the decision is binary, either a "1" or "0" signal is echoed even if there is no transceiver then transmitting and the signal actually received at the echoing transceiver has only noise content. It would be advantageous for the echoing transceiver to be dormant when all of the stations in the system are inactive. Reliable recognition that at least one other station is transmitting a binary data symbol will permit the echoer to be active during transmission and to be dormant when the system is not in active use. Accordingly, it is desirable to provide a detector for recognizing when the common communication medium channel is clear of use.

BRIEF DESCRIPTION OF THE INVENTION

In accordance with the invention, a clear channel detector is provided for a binary digital data transmission system in which a data receiver, at at least one of a plurality of stations connected to a common transmission medium, monitors the binary data symbols transmitted on that medium. The detector receives binary "1" and "0" symbol signals having a first state, e.g. a high level, if the associated symbol is recovered and receives the remaining state, e.g. a low level, if the associated symbol is not recovered. Channel noise is most likely received simultaneously as both symbols. A differential amplifier converts the difference in the unipolar signals at the symbol inputs to a bipolar signal, with polarity indicative of the stronger symbol then being received. An absolute value subcircuit operates on the differential amplifier output to provide a unipolar output signal whenever either, but not both or neither, of the symbol signals is present. The absolute value subcircuit output is compared to an adjustable threshold to provide a logical signal indicating when the common data transmission channel is clear or when it is in use.

Accordingly, it is an object of the present invention to provide a novel clear channel detector for use in a binary digital data communication system.

This and other objects of the present invention will become apparent to those skilled in the art upon consideration of the following detailed description, when read in conjunction with the drawings.

BRIEF DESCRIPTION OF THE DRAWINGS

FIGS. 1a–1e are a set of coordinated graphs illustrating the signal waveforms appearing in the circuit of FIG. 1 and useful in understanding operation of the detector; and FIG. 1f is a graph illustrating tne detector input/output relationship and also useful in understanding detector operation.

DETAILED DESCRIPTION OF THE INVENTION

Figure 1:
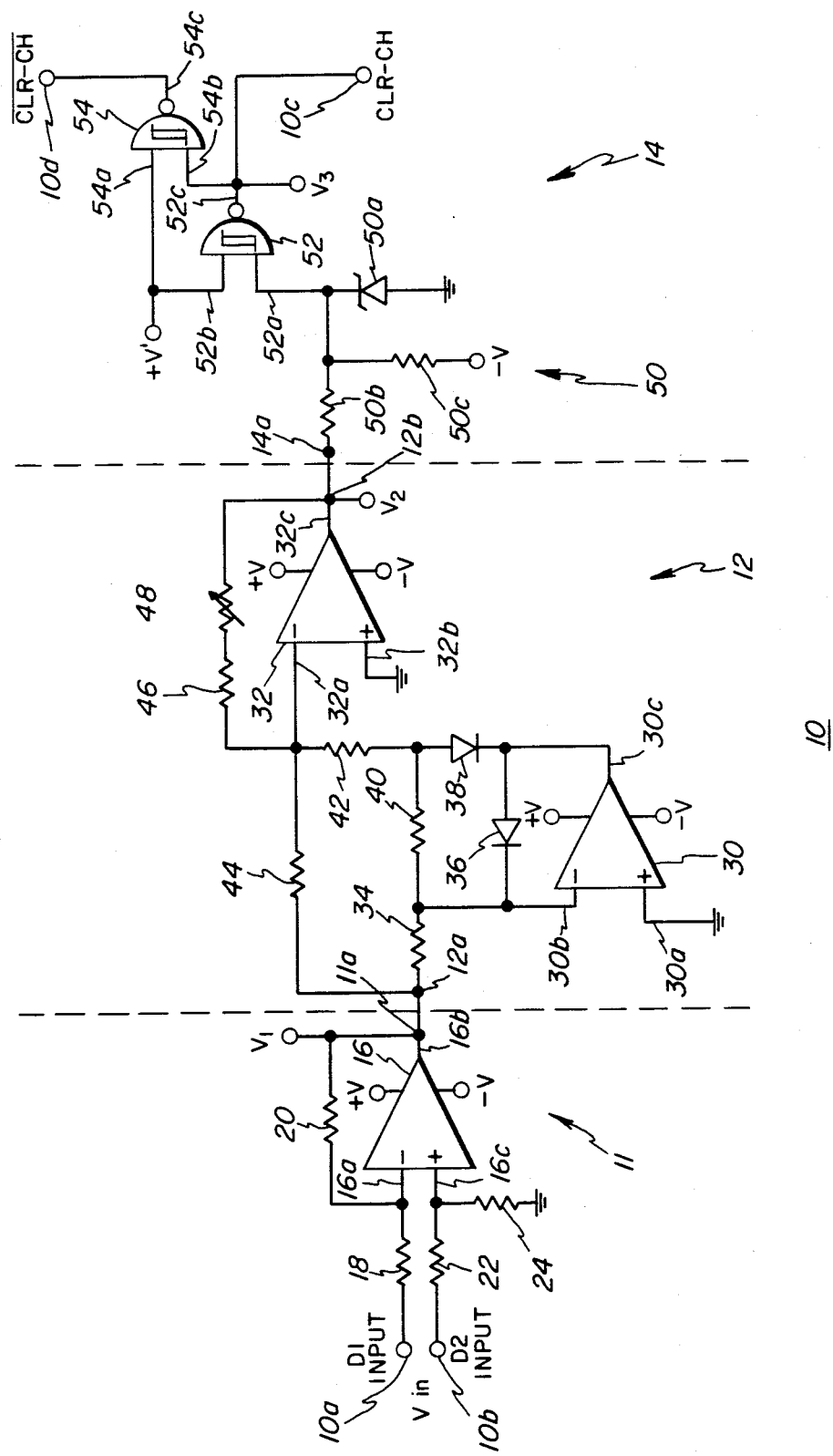
FIG. 1 is a schematic diagram of a clear channel detector in accordance with the principles of the present invention.

Referring now to the drawings, our novel binary digital communications system clear channel detector 10 receives a high logic level signal at one of inputs 10a and 10b, respectively, whenever a receiving transceiver, in a communication system having a plurality of such transceivers connected by a common transmission medium, respectively, receives one or the other binary data symbol. For example, the first data D1 input 10a receives a high logic level signal of amplitude $V_a$ (FIG. 1a) only if the station receiver (not shown) has recovered a logic b 1 data bit, as during bit-time intervals $T_1$ and $T_3$ in FIG. 1a. The second data D2 input 10b receives a high logic level signal, also of substantially the same amplitude $V_a$ (FIG. 1b), only if the station receiver has recovered a logic 0 data bit, as during bit-time intervals $T_2$ and $T_4$ in FIG. 1b. The data receiver portion of a data system transceiver, prior to detector 10, can be configured for the particular signals utilized for the actual data transmission; for a system using a chirped frequency data transmission format, such as is described and claimed in co-pending application Ser. No. 301,706, filed Sept. 14, 1981, assigned to the assignee of the present invention and incorporated herein by reference in its entirety, the first data D1 input 10a receives a high logic level signal corresponding to a logic "1" received symbol from a buffer 305a and the second data D2 input 10b receives a high logic level signal corresponding to a logic "0" received symbol from a buffer 305b, where buffers 305a and 305b are as shown in FIG. 3c of that copending application.

Detector 10 provides a clear channel CLR-CH output at a first output terminal 10c, or a channel-in-use $\overline{CLR\text{-}CH}$ signal at another output 10d, by comparing the relative strengths of the high logic level logic "1" and logic "0" symbol signals received at inputs 10a and 10b. The symbol signals are applied to a differential amplifier subcircuit 11. The amplified, differential input symbol signals appear as a signal voltage $V_1$ at the differential amplifier output (FIG. 1c). This signal voltage $V_1$ is applied to an absolute-value subcircuit 12, which provides an output voltage $V_2$ (FIG. 1d) of a preselected polarity, regardless of the polarity of the differential amplifier output voltage $V_1$. The magnitude of the absolute value subcircuit output voltage $V_2$ is adjusted to a level allowing a decision to be made in a subsequent trigger subcircuit 14 as to the presence of noise or signal on the communications medium.

Differential amplifier 11 utilizes a first operational amplifier 16 having an inverting—input 16a connected to first data D1 input 10a through a first input resistance 18. Input 16a is connected through a feedback resistance 20 to the operational amplifier output 16b, which is the differential amplifier output 11a at which voltage $V_1$ appears. A non-inverting+input 16c is connected to second data D2 input 10b through a second input resistance 22 and is connected through a second feedback resistance 24 to ground potential.

As shown in FIGS. 1a-1c, at time prior to a first bit-time interval $T_1$, neither logic symbol is being received and both the logic "1" symbol signal at the first data D1 input 10a and the logic "0" symbol signal at the second data D2 input 10b are at approximately a zero level, with only noise voltages present. This is indicative of the common communication medium of the system not then being in use. During a first time interval T1 a logic "1" binary data bit, or symbol, is recovered by the preceeding receiver, providing a first, high level pulse 25 of peak value $V_a$ at the first data D1 input 10a. During the same bit-time interval T1, the logic "0" detector has not detected a logic 0 symbol and provides a low level (substantially zero) voltage at the second data D2 input 10b. In the next data bit interval $T_2$, the preceeding receiver has detected a binary "0" symbol and the second data D2 input 10d receives a high level pulse 26 of peak amplitude $V_a$; the first data D1 input 10a receives a substantially-zero level. In a third bit-time interval $T_3$, a logic "1" symbol is again received, although in this time interval the communication medium has experienced a rapid fading such that there is some noise voltage superimposed upon the top of the high level pulse 27. The second data D2 input 10b is at a substantially-zero voltage level, with some noise voltage present thereat, also. In bit-time interval $T_4$, the preceeding receiver has recovered a logic "0" data bit, whereby a high level pulse 28 is present at second data D2 input 10b and a substantially-zero low level signal is present at first D1 input 10a; both the pulse 28 and the substantially-zero level at input 10a have some noise contribution added thereto due to the continued additional attenuation in the channel. After bit-time interval $T_4$, the station previously transmitting has ceased transmission; however, in time interval $T_5$ a noise burst has caused both symbol signals 29a and 29b to be respectively present at inputs 10a and 10b respectively. Thereafter, only noise voltage appears about the substantially-zero levels at both the first and second data inputs 10a and 10b.

The differential amplifier output voltage $V_1$ (FIG. 1c) thus has some noise voltage present about a substantially-zero low output level both before bit-time interval $T_1$ and after the time interval $T_4$. During bit-time interval $T_1$, the output voltage $V_1$ is of negative-polarity and of an amplitude $gV_a$ as the amplifier output saturates responsive to pulse 25. Illustratively, the differential amplifier gain g is on the order of 10 times. Similarly, during the second bit-time interval $T_2$, the logic "0" symbol pulse 26 at second input 10b causes the differential amplifier output to saturate at a positive-polarity voltage $gV_a$. During time intervals $T_3$ and $T_4$, pulses 27 and 28, respectively, provide an output voltage having some noise contribution about the respective $-gV_a$ and $+gV_a$ levels. In time interval $T_5$, the high level pulses 29a and 29b appear simultaneously at the inputs 10a and 10b; the differential input voltage $V_{in}$ is, however, a low-level voltage and, as the amplifier output voltage $V_1 = -gV_{in}$, the voltage $V_1$ at output 11a remains at a low-level. It will thus be seen that the detector responds only to the differential binary bit symbol signal and not to "common-mode" symbol signal inputs.

The absolute value subcircuit 12 utilizes a second operational amplifier 30 and a third operational amplifier 32. The non-inverting+input 30a of the second operational amplifier is connected to ground potential, while the inverting–input 30b thereof is connected through an input resistance 34 to the differential amplifier output 11a. The second operational amplifier output 30c is connected to the anode of a first unidirectionally-conducting element 36, e.g. a semiconductor diode and the like. The cathode of diode 36 is connected to input 30b. The cathode of a second unidirectionally-conducting element 38, e.g. a second diode and the like, is connected to output 30c. A resistance element 40 is connected between input 30b and the anode of second diode 38. Another resistance element 42 is connected between the anode of diode 38 and an inverting–input 32a of the third operational amplifier. A third operational amplifier non-inverting+input 32b is connected to ground potential. Input 32a is also connected to the differential amplifier output 11a through a resistance element 44, and is connected through the series combination of a fixed resistance element 46 and a variable resistance element 48 to the output 32c of the third operational amplifier, at which output the absolute value circuit output 12b is formed and output voltage $V_2$ appears. All of the operational amplifiers 16, 30 and 32 are provided with positive and negative operating potentials $+V$ and $-V$, e.g. $\pm 15$ volts D.C. and the like.

The absolute value of the bipolar differential amplifier output voltage $V_1$ appears at the absolute value circuit output 12b. Thus, when only noise voltage is present at the absolute value subcircuit input 12a, the output voltage $V_2$ (FIG. 1d) provides noise voltage thereat, as before bit-time interval $T_1$ and after bit-time interval $T_4$. During the first bit-time interval $T_1$, the absolute value subcircuit inverts the polarity of the input signal portion 25' and provides a positive-polarity signal of amplitude $kV_a$, where k is the product of the differential amplifier gain g and the gain of the absolute value circuit, as adjusted by the combined value of fixed resistance 46 and variable resistance 48. During the second bit-time interval $T_2$, the positive-polarity differential amplifier output portion 26' is not inverted, but is amplified, and appears as an absolute value output circuit signal $V_2$ portion 26'', also having the $kV_a$ level. During the third bit time interval $T_3$, the negative-polarity portion 27' at the subcircuit 12 input is inverted and appears as a positive-polarity portion 27' of the absolute value subcircuit output voltage $V_2$. Similarly, during the fourth bit-time interval $T_4$, the positive-polarity input voltage portion 28' is not inverted and appears as a positive polarity output voltage portion 28'' also having an average $kV_a$ level. The portions 27'' and 28'' may have some noise contribution riding upon the average positive level thereof, dependent upon whether the combined gains of differential amplifier 11 and absolute value subcircuit 12 are sufficient to provide the output 12b voltage at the positive saturation level of third operational amplifier 32. Note that during time interval $T_5$, the differential amplifier output voltage $V_1$ is at a low D.C. level and the absolute-value subcircuit output is also at a low level (at portion 29'').

A trigger input 14a of the trigger subcircuit 14 receives the absolute value subcircuit output voltage $V_2$ from the subcircuit output 12b. A level-shifter/clamp means 50 utilizes a zener diode 50a (as a voltage clamp), in conjunction with a series resistance 50b between input 14a and the cathode of diode 50a, and a second resistance element 50c, from the cathode of zener diode 50a to the negative operating potential $-V$ source. The level-shifted and clamped absolute value subcircuit voltage is applied to a first input 52a of a 2-input Schmitt-trigger type NAND gate 52. The remaining input 52b of gate 52 is connected to a positive logic operating potential $+V'$, as is one input 54a of a second Schmitt-trigger-type NAND gate 54. The remaining input 54b of second gate 54 is connected to a first gate output 52c, at which the CLR-CH voltage $V_3$ signal and system output 10c are connected. The $\overline{\text{CLR-CH}}$ output 10d is provided at the second gate output 54c. Each of gates 52 and 54 have their own internal threshold voltage $V_t$, against which the absolute value subcircuit output voltage $V_2$ is compared. Gates 52 and 54 may be part of a standard TTL 7413 integrated circuit and the like. Level-shifting/clamping network 50 is required only if the particular gate 52 selected has input characteristics such that damage might occur if the full range of voltages available at output 12b are applied directly thereto. Thus, zener diode 50a prevents a positive voltage in excess of some maximum positive voltage from being applied to gate input 52a, and also heavily conducts in its reverse-bias direction to prevent any substantial negative-polarity voltage from being applied to input 52a, as required by the particular TTL gates utilized. The level-shifting network of resistors 50b and 50c is utilized to shift the positive-polarity voltages at output 12b to a positive-polarity voltage of lesser magnitude, as required by the input characteristics of gate 52.

Responsive to a substantially zero magnitude output voltage $V_2$ at subcircuit output 12b (as occurs before bit time interval $T_1$ and after bit time interval $T_4$), the level-shifted signal applied to gate input 52a is less than the threshold voltage $V_t$ thereof and the gate output voltage $V_3$ (FIG. 1e) is substantially at a high logic 1 (e.g. about $+V'$ volts) level. During bit time intervals $T_1$–$T_4$, the absolute value subcircuit voltage $V_2$ is at a level $kV_a$, which level, even after level shifting in network 50, is greater than the threshold voltage $V_t$ of gate 52. Therefore, a logic 1 level appears at both gate inputs 52a and 52b, and the gate output voltage $V_3$ falls to a logic 0 level. After time interval $T_4$, only noise is present at output voltage $V_2$, which is less than threshold voltage $V_t$, whereby the $\overline{\text{CLR-CH}}$ output terminal 10c is provided with a gate output voltage $V_3$ at the logic 1 level. Thus, the clear channel output 10c is at a logic 0 level only if the channel is in use and is at a logic 1 level when only noise is present on the transmission medium. Gate 54 acts as a simple logic inverter, whereby the CLR-CH output 10d is at a logic 1 level whenever the common transmission medium is actually in use and is at a logic 0 level at all other times. Restated in slightly different terms, the clear channel output 10c voltage $V_3$ (FIG. 1f) is at a logic 1 level whenever the differential input voltage $V_{in}$ (between first data D1 input 10a and second data D2 input 10b) is of an absolute value less than some equivalent threshold voltage $V_t'$. This equivalent threshold voltage is the threshold voltage of gate 52, modified by the total gain k due to the gain g of the differential amplifier and the "gain", if any, of the absolute value circuit. It will be seen that for all input voltages greater than the equivalent threshold voltage $V_t'$, the clear channel output voltage $V_3$ is at a low, logic 0 level. Since the output clear channel signal $V_3$ is based on the relative strength of the "1" and "0" data bit symbols at inputs 10a and 10b, respectively, rather than the level of the composite signal at the receiver, a decision that the channel is clear, and that one of the plurality of stations on the system is not transmitting, is more reliable than in conventional carrier-sense approaches.

While one presently preferred embodiment of our novel clear channel detector for use in a digital data communications system is presented by way of description herein, many modifications and variations will now become apparent to those skilled in the art. It is our intent, therefore, to be limited only by the scope of the appending claims, and not by the specific details and instrumentalities presented by way of description herein.

What is claimed is:

1. A detector, for use with binary 1 and binary 0 symbol detector outputs of a receiver in at least one of a plurality of stations in a system for binary data transmission over a common transmission medium channel, comprising:
   first means, receiving the binary 1 and binary 0 symbol outputs, for providing an output signal having a polarity changing with a change in binary symbol signal received and also for providing said output signal substantially at a predetermined magnitude only if neither one, or both simultaneously, of the binary symbol outputs are received;
   second means for providing the absolute value of said first means output signal to provide a unipolar output signal having a magnitude responsive to said absolute value of said first means output signal; and
   third means for providing at least a first detector output signal, indicative of said channel then being in use, only if said unipolar second means output signal magnitude exceeds a threshold value.

2. The detector of claim 1, wherein said third means includes a logic gate having an input receiving said second means output signal and an output having a logic state responsive to a comparison of the magnitude of the second means output signal at said logic gate input with respect to a predetermined threshold magnitude.

3. The detector of claim 1, wherein said third means provides an additional detector output signal responsive to the presence of one of (a) both of said binary symbol outputs being simultaneously received at said first means, and (b) neither of said binary symbol outputs being received at said first means.

4. The detector of claim 3, wherein said third means includes a logic gate having an input receiving said second means output signal and an output having a logic state responsive to a comparison of the magnitude of the second means output signal at said logic gate input with respect to a predetermined threshold magnitude.

5. The detector of claim 4, wherein said third means further includes a logic inverter having an input connected to the output of said logic gate and having an output at which said additional detector output signal appears.

6. The detector of claim 2, further comprising means coupled between said second means output and said logic gate input for shifting the level of said second means output signal.

7. The detector of claim 6, wherein said level-shifting means includes a voltage divider circuit.

8. The detector of claim 2, further comprising means coupled to the input of said logic gate for preventing application of potentiallyhazardous signal magnitudes thereto.

9. The detector of claim 1, wherein said first means includes a differential amplifier having first and second inputs respectively receiving respective ones of the binary 1 and binary 0 symbol outputs, and an output at which said first means output signal appears with a polarity determined by that one of said differential amplifier inputs then receiving a substantially non-zero signal level.

10. The detector of claim 1, wherein said second means includes: first and second operational amplifiers, each having an inverting input, a non-inverting input coupled to a common potential, and an output; a first resistance element having a first terminal coupled to said first operational amplifier inverting input and a second terminal receiving said first means output signal; a first unidirectionally-conducting element having an anode connected to said first operational amplifier output and a cathode connected to said first operational amplifier inverting input; a second unidirectionally-conducting element having a cathode connected to said first operational amplifier output and an anode; a second resistance element coupled between said first operational amplifier inverting input and said second unidirectionally-conducting element anode; a third resistance element coupled between the second operational amplifier inverting input and the junction between said second resistance element and said second unidirectionally-conducting element; a fourth resistive element having a first terminal connected to said second operational amplifier inverting input and a second terminal receiving said first means output signal; and a fifth resistive element coupled between the inverting input and output of said second operational amplifier; said second means output signal being obtained at the second operational amplifier output.

11. The detector of claim 10, wherein said fifth resistance element has a variable resistance magnitude.

* * * * *